(12) United States Patent
Kibayashi et al.

(10) Patent No.: US 11,346,101 B2
(45) Date of Patent: May 31, 2022

(54) STRUCTURE

(71) Applicant: Mitsubishi Electric Corporation, Chiyoda-ku (JP)

(72) Inventors: Yusuke Kibayashi, Chiyoda-ku (JP); Atsushi Kato, Chiyoda-ku (JP); Keisho Okamoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/975,222

(22) PCT Filed: Mar. 4, 2019

(86) PCT No.: PCT/JP2019/008410
§ 371 (c)(1),
(2) Date: Aug. 24, 2020

(87) PCT Pub. No.: WO2019/220743
PCT Pub. Date: Nov. 21, 2019

(65) Prior Publication Data
US 2020/0392725 A1  Dec. 17, 2020

(30) Foreign Application Priority Data

May 18, 2018  (JP) .............................. JP2018-095990

(51) Int. Cl.
*E04B 1/80* (2006.01)
*G02B 5/08* (2006.01)
*B32B 7/027* (2019.01)

(52) U.S. Cl.
CPC .............. *E04B 1/806* (2013.01); *B32B 7/027* (2019.01); *G02B 5/0816* (2013.01);
(Continued)

(58) Field of Classification Search
CPC . B32B 7/027; B32B 2250/05; B32B 2307/30; Y10T 428/24942
See application file for complete search history.

(56) References Cited

U.S. PATENT DOCUMENTS

2013/0215618 A1   8/2013 Matsuura
2017/0138040 A1*  5/2017 Groft .................. B32B 5/20

FOREIGN PATENT DOCUMENTS

JP  2006-177136 A      7/2006
JP  2006177136 A  *   7/2006  ........... E04D 12/002
(Continued)

OTHER PUBLICATIONS

[NPL-1] Murahashi et al. (JP 2006/177136 A). Jun. 6, 2006 (EPO machine translation to English). (Year: 2006).*
(Continued)

*Primary Examiner* — Frank J Vineis
*Assistant Examiner* — Donald M Flores, Jr.
(74) *Attorney, Agent, or Firm* — Oblon, McClelland, Maier & Neustadt, L.L.P.

(57) ABSTRACT

A structure includes: a first portion including a first front surface and a first rear surface that faces opposite to the first front surface; a second portion including a second front surface that faces opposite to the first front surface, and a second rear surface that faces opposite to the second front surface; a support portion that supports the first portion and the second portion; a first film formed on the first front surface; a second film formed on the first rear surface; and a third film (an eighth film, a ninth film and a tenth film) formed on at least a part of a surface of the support portion. A thermal emissivity of the first film is higher than thermal emissivities of the second film, the eighth film, the ninth film, and the tenth film.

20 Claims, 2 Drawing Sheets

(52) U.S. Cl.
CPC ....... *B32B 2250/05* (2013.01); *B32B 2307/30* (2013.01); *Y10T 428/24942* (2015.01)

(56) References Cited

FOREIGN PATENT DOCUMENTS

| | | |
|---|---|---|
| JP | 2007-16558 A | 1/2007 |
| JP | 2012-79585 A | 4/2012 |

OTHER PUBLICATIONS

International Search Report dated May 7, 2019 in PCT/JP2019/008410 filed Mar. 4, 2019, 1 page.

* cited by examiner

STRUCTURE

TECHNICAL FIELD

The present invention relates to a structure, and particularly to a structure including a portion to which heat is input from outside.

BACKGROUND ART

Examples of a structure including a portion to which heat is input from outside include a building. There has been conventionally known a building in which a sheet having a high thermal emissivity is attached to outer surfaces of a roof and an outer wall in order to prevent heat transferred from outside to the roof and the outer wall from being transmitted to a room.

Japanese Patent Laying-Open No. 2006-177136 discloses an outer wall structure in which a heat insulating member and an exterior member are disposed on the outdoor side of a structure framework, a coating having a high emissivity is provided on an outer surface of the exterior member of a building, and a coating having a low emissivity is provided only on an inner surface of the exterior member.

CITATION LIST

Patent Literature

PTL 1: Japanese Patent Laying-Open No. 2006-177136

SUMMARY OF INVENTION

Technical Problem

However, in the outer wall structure described in Japanese Patent Laying-Open No. 2006-177136, it is difficult to sufficiently suppress heat emission from the exterior member to the structure framework. Therefore, a temperature distribution in the exterior member and a temperature distribution corresponding to a magnitude relationship of view factors of the exterior member and the structure framework are also formed within the structure framework.

Particularly when a temperature difference between a first exterior member and a second exterior member is relatively large in an outer wall structure in which the first exterior member and the second exterior member are arranged to sandwich one structure framework, a temperature difference between a portion of the structure framework where a view factor of the first exterior member is larger than a view factor of the second exterior member and a portion of the structure framework where the view factor of the second exterior member is larger than the view factor of the first exterior member is also large. As a result, in the conventional structure, a relatively large thermal stress is applied to the structure framework due to the above-described temperature difference, and thus, it is difficult to suppress deformation of the structure framework.

It is a main object of the present invention to provide a structure including a plurality of heat input portions to which heat is input from outside and a support portion that supports the plurality of heat input portions, wherein heat emission from the plurality of heat input portions to the support portion is suppressed as compared with the above-described conventional structure.

Solution to Problem

A structure according to the present invention includes: a first portion including a first front surface and a first rear surface that faces opposite to the first front surface; a second portion including a second front surface that faces opposite to the first front surface, and a second rear surface that faces opposite to the second front surface; a support portion that supports the first portion and the second portion; a first film formed on the first front surface; a second film formed on the first rear surface; and a third film formed on at least a part of a surface of the support portion. A thermal emissivity of the first film is higher than thermal emissivities of the second film and the third film.

Advantageous Effects of Invention

According to the present invention, there can be provided a structure including a plurality of heat input portions to which heat is input from outside and a support portion that supports the plurality of heat input portions, wherein heat emission from the plurality of heat input portions to the support portion is suppressed as compared with the above-described conventional structure.

DESCRIPTION OF EMBODIMENTS

Embodiments of the present invention will be described hereinafter with reference to the drawings, in which the same or corresponding portions are denoted by the same reference numerals and description thereof will not be repeated.

First Embodiment

<Configuration of Structure>

Figure 1:
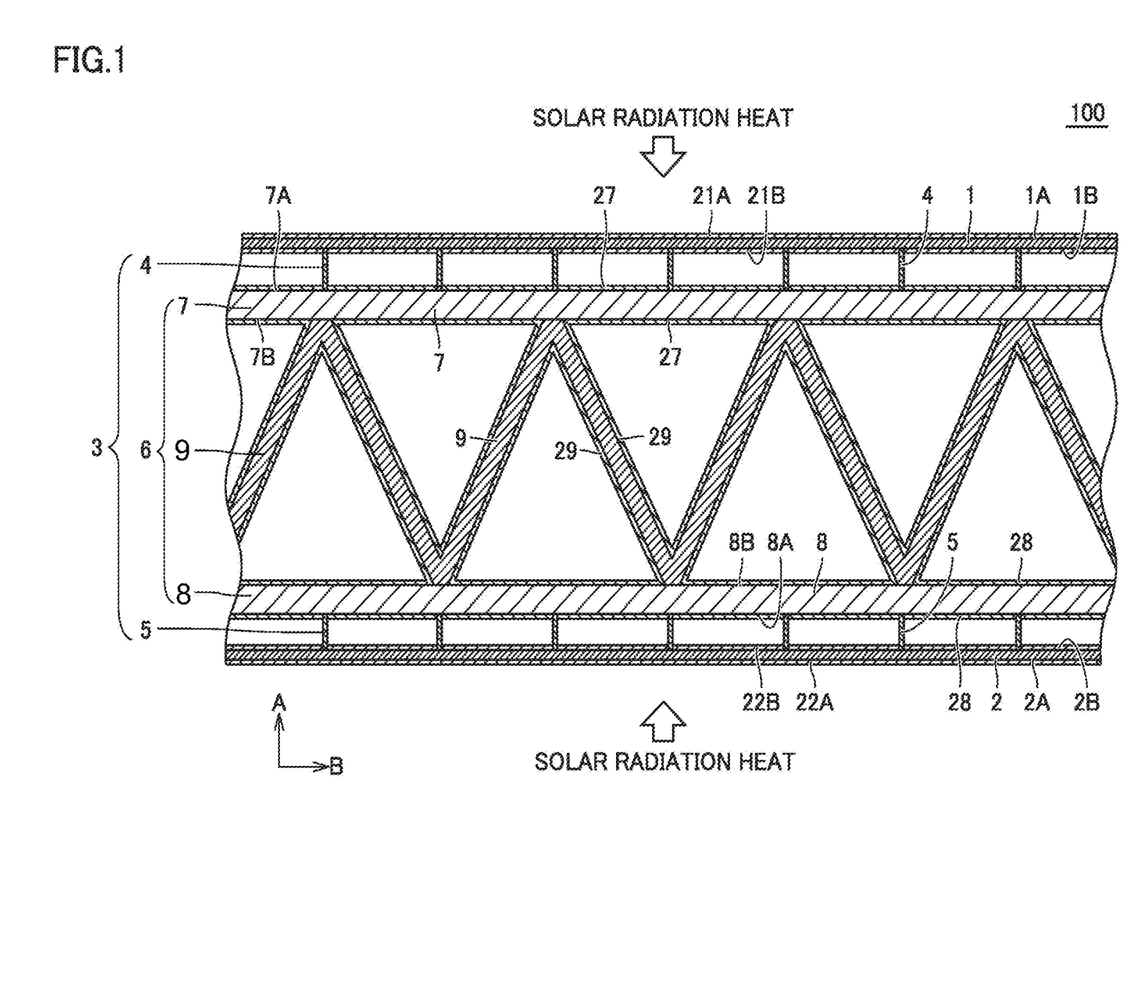
FIG. 1 is a cross-sectional view showing a structure according to a first embodiment.

As shown in FIG. 1, a structure 100 according to a first embodiment mainly includes a first portion 1, a second portion 2 and a support portion 3.

First portion 1 and second portion 2 are portions to which heat is input from outside structure 100. First portion 1 includes a first front surface 1A and a first rear surface 1B that faces opposite to first front surface 1A. First front surface 1A faces toward the outside of structure 100. First rear surface 1B faces toward the support portion 3 side.

Second portion 2 includes a second front surface 2A that faces opposite to first front surface 1A, and a second rear surface 2B that faces opposite to second front surface 2A. Second front surface 2A faces toward the outside of structure 100. Second rear surface 2B faces toward the support portion 3 side.

First front surface 1A is parallel to, for example, second rear surface 2B. First rear surface 1B is parallel to, for example, second front surface 2A. Each of first front surface 1A, first rear surface 1B, second front surface 2A, and second rear surface 2B is, for example, a flat surface. Each of first front surface 1A, first rear surface 1B, second front surface 2A, and second rear surface 2B may be an emission surface. First front surface 1A, first rear surface 1B, second front surface 2A, and second rear surface 2B are orthogonal to, for example, a first direction A. Each of first portion 1 and second portion 2 is formed, for example, like a plate. Each of first portion 1 and second portion 2 may be formed, for example, as a radio wave reception and transmission portion (main reflecting mirror) of an antenna, or may be formed as a support member that supports a main reflecting mirror and a radiator of a parabola antenna.

Support portion 3 supports first portion 1 and second portion 2. Support portion 3 may have an arbitrary configuration, and includes, for example, a plurality of first support members 4, a plurality of second support members 5 and a frame member 6.

The plurality of first support members 4 support first portion 1. Each first support member 4 is connected to first rear surface 1B of first portion 1 and a fourth front surface 7A of a first frame member 7 described below. A total sum of cross-sectional areas of the plurality of first support members 4 perpendicular to first direction A is less than an area of first rear surface 1B. A total sum of surface areas of the plurality of first support members 4 extending along first direction A is less than the area of first rear surface 1B. First support members 4 connected to first rear surface 1B of first portion 1 and fourth front surface 7A of first frame member 7 are partially formed in a space sandwiched between first rear surface 1B and fourth front surface 7A. Therefore, heat emission from first rear surface 1B to fourth front surface 7A is more dominant than heat conduction and heat emission through first support members 4 connected to first rear surface 1B.

The plurality of second support members 5 support second portion 2. Each second support member 5 is connected to second rear surface 2B of second portion 2 and a fifth front surface 8A of a second frame member 8 described below. A total sum of cross-sectional areas of the plurality of second support members 5 perpendicular to first direction A is less than an area of second rear surface 2B. Second support members 5 connected to second rear surface 2B of second portion 2 and fifth front surface 8A of second frame member 8 are partially formed in a space sandwiched between second rear surface 2B and fifth front surface 8A. Therefore, heat emission from second rear surface 2B to fifth front surface 8A is more dominant than heat conduction and heat emission through second support members 5 connected to second rear surface 2B.

Frame member 6 is arranged between first rear surface 1B and second rear surface 2B, and connects first support members 4 and second support members 5. Frame member 6 may have an arbitrary configuration, and includes, for example, first frame member 7, second frame member 8 and a third frame member 9. First frame member 7, second frame member 8 and third frame member 9 form, for example, a truss structure. First frame member 7 and second frame member 8 extend, for example, along a second direction that intersects with first direction A.

First frame member 7 includes fourth front surface 7A that faces toward the first front surface 1A side, and a fourth rear surface 7B that faces opposite to fourth front surface 7A. Fourth front surface 7A is opposed to first rear surface 1B. As described above, fourth front surface 7A is connected to first support members 4.

Second frame member 8 includes fifth front surface 8A that faces toward the second front surface 2A side, and a fifth rear surface 8B that faces opposite to fifth front surface 8A. Fifth front surface 8A is opposed to second rear surface 2B. As described above, fifth front surface 8A is connected to second support members 5.

Third frame member 9 is connected to first frame member 7 and second frame member 8. Third frame member 9 includes a plurality of first portions extending in a third direction that intersects with first direction A and second direction B, and a plurality of second portions extending in a fourth direction that intersects with first direction A, second direction B and the third direction. The first portions are spaced apart from each other in second direction B. The second portions are spaced apart from each other in second direction B. One end of each first portion is connected to one of the second portions that are adjacent to each other in second direction B, and the other end of each first portion is connected to the other of the second portions that are adjacent to each other in second direction B.

A first film 21A is formed on first front surface 1A of first portion 1. A second film 21B is formed on first rear surface 1B of first portion 1. A fourth film 22A is formed on second front surface 2A of second portion 2. A fifth film 22B is formed on second rear surface 2B of second portion 2. A third film is formed on at least a part of a surface of support portion 3. The third film is, for example, formed only on a surface of frame member 6. The third film includes an eighth film 27, a ninth film 28 and a tenth film 29.

Eighth film 27 is formed on fourth front surface 7A and fourth rear surface 7B of first frame member 7. Ninth film 28 is formed on fifth front surface 8A and fifth rear surface 8B of second frame member 8. Tenth film 29 is formed on a surface of third frame member 9.

A thermal emissivity of first film 21A is higher than thermal emissivities of second film 21B, eighth film 27, ninth film 28, and tenth film 29. Preferably, a solar radiation reflectivity of first film 21A is higher than solar radiation reflectivities of second film 21B, eighth film 27, ninth film 28, and tenth film 29. The thermal emissivity is measured in accordance with, for example, JIS A 1423 "Simplified test method for normal emissivity by infrared radiation thermometer". The solar radiation reflectivity is measured in accordance with, for example, JIS K 5602 "Method for determining solar radiation reflectivity of coating".

A thermal emissivity of fourth film 22A is higher than thermal emissivities of second film 21B, fifth film 22B, eighth film 27, ninth film 28, and tenth film 29. Preferably, a solar radiation reflectivity of fourth film 22A is higher than solar radiation reflectivities of second film 21B, fifth film 22B, eighth film 27, ninth film 28, and tenth film 29. The thermal emissivity of first film 21A is equal to, for example, the thermal emissivity of fourth film 22A. The solar radiation reflectivity of first film 21A is equal to, for example, the solar radiation reflectivity of fourth film 22A.

For example, the thermal emissivities of second film 21B, fifth film 22B, eighth film 27, ninth film 28, and tenth film 29 are equal to each other. The solar radiation reflectivities of second film 21B, fifth film 22B, eighth film 27, ninth film 28, and tenth film 29 are equal to each other.

Each film may be formed by an arbitrary method, and each film is formed, for example, by applying a coating material. A material for first film 21A and fourth film 22A includes, for example, a metal foil, a metal plate or a coating material that includes a metal having a high emissivity. A material for second film 21B, fifth film 22B, eighth film 27, ninth film 28, and tenth film 29 includes, for example, aluminum (Al), zinc (Zn) or magnesium (Mg). Basically, a glossy metal surface has a low emissivity (in other words, the glossy metal surface is regarded as a metal surface that is not suitable for first film 21A and fourth film 22A). However, when the metal undergoes oxidation and an oxide film is formed on the metal surface, the emissivity becomes high. Aluminum (Al) has a low emissivity even after oxidation. Therefore, the material for second film 21B, fifth film 22B, eighth film 27, ninth film 28, and tenth film 29 is preferably mainly composed of aluminum (Al).

<Function and Effect>

Structure 100 includes: first portion 1 including first front surface 1A and first rear surface 1B that faces opposite to first front surface 1A; second portion 2 including second front surface 2A that faces opposite to first front surface 1A and second rear surface 2B that faces opposite to second front surface 2A; support portion 3 that supports first portion 1 and second portion 2; first film 21A formed on first front surface 1A; second film 21B formed on first rear surface 1B; and the third film (eighth film 27, ninth film 28 and tenth film 29) formed on at least a part of the surface of support portion 3. The thermal emissivity of first film 21A is higher than the thermal emissivities of second film 21B, eighth film 27, ninth film 28, and tenth film 29.

In above-described structure 100, the thermal emissivity of first film 21A formed on first front surface 1A of first portion 1 that faces toward the outside is higher than the thermal emissivity of second film 21B formed on first rear surface 1B of first portion 1 that faces toward support portion 3. As a result, heat of first portion 1 is more likely to be emitted to the outside of structure 100 than to the support portion 3 side. Therefore, in structure 100, heat emission from first portion 1 to support portion 3 is suppressed, as compared with heat emission from a heat input portion to a structure framework of a conventional structure.

As a result, when a temperature of first portion 1 is higher than a temperature of second portion 2, a temperature difference between a portion (e.g., first frame member 7) of support portion 3 where a view factor of first portion 1 is larger than a view factor of second portion 2 and a portion (e.g., second frame member 8) of support portion 3 where the view factor of second portion 2 is larger than the view factor of first portion 1 is less than a temperature difference between first portion 1 and second portion 2. That is, even when the temperature difference between first portion 1 and second portion 2 is relatively large, formation of the temperature difference in support portion 3 is suppressed. As a result, when the temperature difference between first portion 1 and second portion 2 of structure 100 is equal to a temperature difference between exterior members of a conventional structure, a thermal stress applied to support portion 3 of structure 100 is smaller than a thermal stress applied to a structure framework of the conventional structure. Therefore, deformation caused by the thermal stress is less likely to occur in structure 100 than in the conventional structure.

In above-described structure 100, the solar radiation reflectivity of first film 21A is higher than the solar radiation reflectivities of second film 21B, eighth film 27, ninth film 28, and tenth film 29.

Therefore, solar radiation heat that enters first film 21A from outside structure 100 is easily reflected to the outside by first film 21A and is not easily absorbed by first portion 1. Therefore, in above-described structure 100, an increase in temperature of first portion 1 caused by the solar radiation heat that enters first film 21A from outside structure 100 is suppressed. As a result, an amount of heat emitted from first portion 1 to support portion 3 is reduced, as compared with that when the solar radiation emissivity reflectivity of first film 21A is equal to or lower than the solar radiation reflectivities of second film 21B, eighth film 27, ninth film 28, and tenth film 29.

Above-described structure 100 further includes fourth film 22A formed on second front surface 2A, and fifth film 22B formed on second rear surface 2B. The thermal emissivity of fourth film 22A is higher than the thermal emissivities of second film 21B, eighth film 27, ninth film 28, and tenth film 29.

The solar radiation heat is more likely to enter, from outside structure 100, first portion 1 and second portion 2 including first front surface 1A and second front surface 2A that face toward the outside of structure 100, as compared with support portion 3. On the other hand, the thermal emissivities of first film 21A and fourth film 22A is higher than the thermal emissivities of second film 21B and fifth film 22B. Thus, the heat of first portion 1 and second portion 2 is more likely to be emitted to the outside of structure 100 than to the support portion 3 side. Therefore, in structure 100, heat emission from first portion 1 to support portion 3 and heat emission from second portion 2 to support portion 3 are suppressed, as compared with heat emission from heat input portions to a structure framework of a conventional structure. When a temperature difference between first portion 1 and second portion 2 of structure 100 is equal to a temperature difference between exterior members of the conventional structure, a thermal stress applied to support portion 3 of structure 100 is smaller than a thermal stress applied to the structure framework of the conventional structure. Therefore, deformation caused by the thermal stress is less likely to occur in structure 100 than in the conventional structure.

In above-described structure 100, the thermal emissivity of first film 21A is equal to the thermal emissivity of fourth film 22A. In such structure 100, first portion 1 and second portion 2 may be configured to be symmetric with respect to a symmetric axis that passes through an intermediate portion between first portion 1 and second portion 2 and extends along second direction B. Therefore, even when structure 100 is, for example, arranged under the environment where a magnitude relationship of the solar radiation heat that enters each of first portion 1 and second portion 2 changes, structure 100 can provide the above-described effect regardless of the change. In addition, first film 21A and fourth film 22A described above may be made of the same material. Therefore, the manufacturing cost of above-described structure 100 can be reduced, as compared with the manufacturing cost of structure 100 in which first film 21A and fourth film 22A are made of different materials.

In above-described structure 100, the thermal emissivities of second film 21B, fifth film 22B, eighth film 27, ninth film 28, and tenth film 29 are equal to each other. Such structure 100 may be configured to be symmetric with respect to the symmetric axis that passes through the intermediate portion between first portion 1 and second portion 2 and extends along second direction B. Therefore, even when structure 100 is, for example, arranged under the environment where a magnitude relationship of the solar radiation heat that enters each of first portion 1 and second portion 2 changes, structure 100 can provide the above-described effect regardless of the change. In addition, second film 21B, eighth film 27, ninth film 28, tenth film 29, and fifth film 22B described above may be made of the same material. Therefore, the manufacturing cost of above-described structure 100 can be reduced, as compared with the manufacturing cost of structure 100 in which second film 21B, eighth film 27, ninth film 28, tenth film 29, and fifth film 22B are made of different materials.

In structure 100, it is unnecessary to arrange a heat shielding member such as a heat insulating member and a metal plate between each of first portion 1 and second portion 2 and support portion 3. In addition, the films such as first film 21A and second film 21B can be reduced in size and weight, as compared with such a heat shielding member. Therefore, structure 100 can be reduced in size and weight, as compared with a structure in which heat input from each of first portion 1 and second portion 2 to support portion 3 is suppressed by the above-described heat shielding member.

When the films such as first film 21A and second film 21B are formed on the surfaces of first portion 1, second portion 2 and support portion 3 by a coating method, deformation of first portion 1, second portion 2 and support portion 3 caused by heat is suppressed, as compared with when the films are formed by, for example, a thermal spraying method. In addition, in structure 100 including the films formed by the coating method, other functions can be easily added only by optimization of the constituent material for the films. For example, when each of second film 21B, fifth film 22B, eighth film 27, ninth film 28, and tenth film 29 is made of a coating material including μl, a high wind and rain resistance and a high salt water resistance are achieved at low cost, as compared with when the feature of the above-described thermal emissivities is achieved by a metal plate instead of the films. Therefore, structure 100 is suitable for a structure arranged under the environment where the structure is exposed to wind and rain.

A main heat path from outside structure 100 to frame member 6 of support portion 3 includes heat emission from first portion 1 and second portion 2 to frame member 6, heat conduction from first portion 1 and second portion 2 to frame member 6 through first support members 4 and second support members 5, and heat emission from first support members 4 and second support members 5 to frame member 6. As described above, support portion 3 is provided such that heat radiation from first portion 1 to frame member 6 contributes to an increase in temperature of frame member 6, as compared with heat conduction through the plurality of first support members 4 and heat radiation from the plurality of first support members 4 to frame member 6. Therefore, in structure 100, a film for suppressing heat emission from first support members 4 and second support members 5 to frame member 6 is unnecessary. In addition, in structure 100, even when areas of first front surface 1A and second front surface 2A are made larger and areas of fourth front surface 7A and fifth front surface 8A are accordingly made larger, an increase in weight of support portion 3 is suppressed. Therefore, structure 100 is suitable for a structure including a radio wave reception and transmission portion of a parabola antenna and a support portion that supports the radio wave reception and transmission portion.

Second Embodiment

Figure 2:
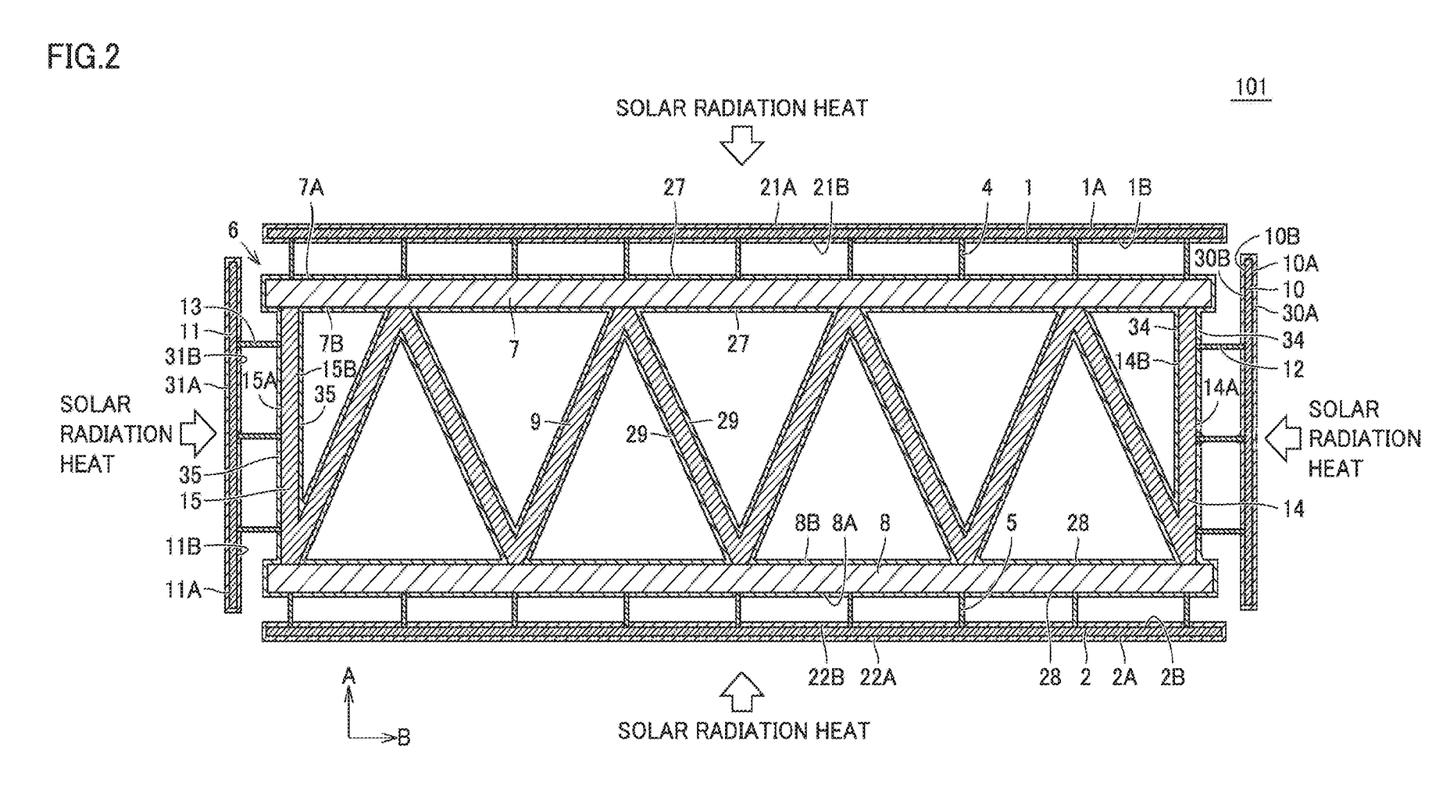
FIG. 2 is a cross-sectional view showing a structure according to a second embodiment.

As shown in FIG. 2, a structure 101 according to a second embodiment is configured basically similarly to structure 100 according to the first embodiment. However, structure 101 according to the second embodiment is different from structure 100 according to the first embodiment in that structure 101 according to the second embodiment further includes a third portion 10 and a fourth portion 11.

Third portion 10 includes a third front surface 10A that faces in a direction different from first front surface 1A and second front surface 2A, and a third rear surface 10B that faces opposite to third front surface 10A. Third front surface 10A faces toward the outside of structure 101. Third rear surface 10B faces toward the support portion 3 side.

Fourth portion 11 includes a sixth front surface 11A that faces opposite to third front surface 10A, and a sixth rear surface 11B that faces opposite to sixth front surface 11A. Sixth front surface 11A faces toward the outside of structure 101. Sixth rear surface 11B faces toward the support portion 3 side. Third portion 10 and fourth portion 11 are supported by support portion 3, together with first portion 1 and second portion 2.

Sixth front surface 11A is parallel to, for example, third front surface 10A. Sixth rear surface 11B is parallel to, for example, third rear surface 10B. Third front surface 10A, third rear surface 10B, sixth front surface 11A, and sixth rear surface 11B are, for example, perpendicular to first front surface 1A, first rear surface 1B, second front surface 2A, and second rear surface 2B. Each of third front surface 10A, third rear surface 10B, sixth front surface 11A, and sixth rear surface 11B may be a flat surface, or may be an emission surface. Each of third portion 10 and fourth portion 11 is formed, for example, like a plate. Each of third portion 10 and fourth portion 11 may be formed, for example, as a main reflecting mirror of an antenna, or as a support member that supports a radiator of a parabola antenna.

In addition to first support members 4, second support members 5 and frame member 6, support portion 3 further includes a plurality of third support members 12 and a plurality of fourth support members 13.

The plurality of third support members 12 support third portion 10. Each third support member 12 is connected to third rear surface 10B of third portion 10 and a seventh front surface 14A of a fourth frame member 14 of third frame member 9 described below. A total sum of cross-sectional areas of the plurality of third support members 12 perpendicular to second direction B is less than an area of third rear surface 10B. A total sum of surface areas of the plurality of third support members 12 extending along second direction B is less than the area of third rear surface 10B. From a different perspective, support portion 3 is provided such that heat radiation from third portion 10 to frame member 6 contributes to heat transfer from third portion 10 to frame member 6, as compared with heat conduction through the plurality of third support members 12.

The plurality of fourth support members 13 support fourth portion 11. Each fourth support member 13 is connected to sixth rear surface 11B of fourth portion 11 and an eighth front surface 15A of a fifth frame member 15 of third frame member 9 described below. A total sum of cross-sectional areas of the plurality of fourth support members 13 perpendicular to second direction B is less than an area of sixth rear surface 11B. A total sum of surface areas of the plurality of fourth support members 13 extending along second direction B is less than the area of sixth rear surface 11B. From a different perspective, support portion 3 is provided such that heat radiation from fourth portion 11 to frame member 6 contributes to heat transfer from fourth portion 11 to frame member 6, as compared with heat conduction through the plurality of fourth support members 13.

Third frame member 9 includes fourth frame member 14 and fifth frame member 15 that form one end and the other end in second direction B. Fourth frame member 14 and fifth frame member 15 connect first frame member 7 and second frame member 8. Fourth frame member 14 includes seventh front surface 14A that faces in second direction B, and a seventh rear surface 14B that faces opposite to seventh front surface 14A. Fifth frame member 15 includes eighth front surface 15A that faces in second direction B, and an eighth rear surface 15B that faces opposite to eighth front surface 15A.

A sixth film 30A is formed on third front surface 10A of third portion 10. A seventh film 30B is formed on third rear surface 10B of third portion 10. An eleventh film 31A is formed on sixth front surface 11A of fourth portion 11. A twelfth film 31B is formed on sixth rear surface 11B of fourth portion 11. A thirteenth film 34 is formed on seventh front surface 14A and seventh rear surface 14B of fourth frame member 14. A fourteenth film 35 is formed on eighth front surface 15A and eighth rear surface 15B of fifth frame member 15. That is, the above-described third film further includes thirteenth film 34 and fourteenth film 35, in addition to eighth film 27, ninth film 28 and tenth film 29.

A thermal emissivity of sixth film 30A is higher than thermal emissivities of seventh film 30B, eighth film 27, ninth film 28, tenth film 29, thirteenth film 34, and fourteenth film 35. Preferably, a solar radiation reflectivity of sixth film 30A is higher than solar radiation reflectivities of seventh film 30B, eighth film 27, ninth film 28, tenth film 29, thirteenth film 34, and fourteenth film 35.

A thermal emissivity of eleventh film 31A is higher than thermal emissivities of twelfth film 31B, eighth film 27, ninth film 28, tenth film 29, thirteenth film 34, and fourteenth film 35. Preferably, a solar radiation reflectivity of eleventh film 31A is higher than solar radiation reflectivities of twelfth film 31B, eighth film 27, ninth film 28, tenth film 29, thirteenth film 34, and fourteenth film 35.

The thermal emissivity of sixth film 30A is equal to, for example, the thermal emissivity of eleventh film 31A. The solar radiation reflectivity of sixth film 30A is equal to, for example, the solar radiation reflectivity of eleventh film 31A.

For example, the thermal emissivities of first film 21A, fourth film 22A, sixth film 30A, and eleventh film 31A are higher than the thermal emissivities of second film 21B, fifth film 22B, seventh film 30B, twelfth film 31B, eighth film 27, ninth film 28, tenth film 29, thirteenth film 34, and fourteenth film 35. The solar radiation reflectivities of first film 21A, fourth film 22A, sixth film 30A, and eleventh film 31A are higher than the solar radiation reflectivities of second film 21B, fifth film 22B, seventh film 30B, twelfth film 31B, eighth film 27, ninth film 28, tenth film 29, thirteenth film 34, and fourteenth film 35.

For example, the thermal emissivities of first film 21A, fourth film 22A, sixth film 30A, and eleventh film 31A are equal to each other. The solar radiation reflectivities of first film 21A, fourth film 22A, sixth film 30A, and eleventh film 31A are equal to each other. The thermal emissivities of second film 21B, fifth film 22B, seventh film 30B, twelfth film 31B, eighth film 27, ninth film 28, tenth film 29, thirteenth film 34, and fourteenth film 35 are equal to each other. The solar radiation reflectivities of second film 21B, fifth film 22B, seventh film 30B, twelfth film 31B, eighth film 27, ninth film 28, tenth film 29, thirteenth film 34, and fourteenth film 35 are equal to each other.

Since structure 101 is configured basically similarly to structure 100, structure 101 can provide the same effect as that of structure 100.

Furthermore, in structure 101, not only heat emission from first portion 1 and second portion 2 to support portion 3 but also heat emission from third portion 10 and fourth portion 11 to support portion 3 is suppressed, as compared with heat emission from heat input portions to a structure framework of a conventional structure. Therefore, structure 101 is, for example, suitable for a structure arranged under the environment where the solar radiation heat enters the structure from a plurality of directions.

<Modification>

In structures 100 and 101 according to the first and second embodiments, a film for reducing heat emission from each surface is not formed on the surface of each of first support members 4, second support members 5, third support members 12, and fourth support members 13. As described above, support portion 3 is provided such that heat emission from each of first portion 1, second portion 2, third portion 10, and fourth portion 11 to frame member 6 contributes to heat transfer from each of first portion 1, second portion 2, third portion 10, and fourth portion 11 to frame member 6, as compared with heat conduction through each of first support members 4, second support members 5, third support members 12, and fourth support members 13. Therefore, in structures 100 and 101, a heat shielding member for suppressing heat emission from each of first support members 4, second support members 5, third support members 12, and fourth support members 13 to frame member 6 is not essential. However, a film for reducing heat emission from each surface may be formed on the surface of each of first support members 4, second support members 5, third support members 12, and fourth support members 13. In this case, thermal emissivities of the films formed on the surfaces of first support members 4, second support members 5, third support members 12, and fourth support members 13 are lower than the thermal emissivity of first film 21A and are equal to, for example, the thermal emissivity of second film 21B.

While the embodiments of the present invention have been described above, the above-described embodiments can also be modified variously. In addition, the scope of the present invention is not limited to the above-described embodiments. The scope of the present invention is defined by the terms of the claims, and is intended to include any modifications within the scope and meaning equivalent to the terms of the claims.

REFERENCE SIGNS LIST 1 first portion; 1A first front surface; 1B first rear surface; 2 second portion; 2A second front surface; 2B second rear surface; 3 support portion; 4 first support member; 5 second support member; 6 frame member; 7 first frame member; 7A fourth front surface; 7B fourth rear surface; 8 second frame member; 8A fifth front surface; 8B fifth rear surface; 9 third frame member; 10 third portion; 10A third front surface; 10B third rear surface; 11 fourth portion; 11A sixth front surface; 11B sixth rear surface; 12 third support member; 13 fourth support member; 14 fourth frame member; 14A seventh front surface; 14B seventh rear surface; 15 fifth frame member; 15A eighth front surface; 15B eighth rear surface; 21A first film; 21B second film; 22A fourth film; 22B fifth film; 27 eighth film; 28 ninth film; 29 tenth film; 30A sixth film; 30B seventh film; 31A eleventh film; 31B twelfth film; 34 thirteenth film; 35 fourteenth film; 100, 101 structure.

The invention claimed is:

1. A structure comprising:
a first portion including a first front surface and a first rear surface that faces opposite to the first front surface;
a second portion including a second front surface that faces opposite to the first front surface, and a second rear surface that faces opposite to the second front surface;
a support portion that supports the first portion and the second portion;
a first film formed on the first front surface;
a second film formed on the first rear surface; and
a third film formed on at least a part of a surface of the support portion, wherein the support portion is disposed between the first portion and the second portion such that the first rear surface and the second rear surface both face toward a support portion side,
a thermal emissivity of the first film is higher than thermal emissivities of the second film and the third film,
the part of the support portion on which the third film is formed does not include any heat shielding member between the third film and the part of the support portion, and
no heat shielding member is arranged between the first film and the first portion and between the second film and the first portion.

2. The structure according to claim 1, wherein a solar radiation reflectivity of the first film is higher than solar radiation reflectivities of the second film and the third film.

3. The structure according to claim 2, further comprising:
a fourth film formed on the second front surface; and
a fifth film formed on the second rear surface, wherein
a thermal emissivity of the fourth film is higher than thermal emissivities of the second film, the third film and the fifth film.

4. The structure according to claim 3, wherein the thermal emissivity of the first film is equal to the thermal emissivity of the fourth film.

5. The structure according to claim 4, wherein the thermal emissivity of the second film, the thermal emissivity of the third film and the thermal emissivity of the fifth film are equal to each other.

6. The structure according to claim 3, wherein the thermal emissivity of the second film, the thermal emissivity of the third film and the thermal emissivity of the fifth film are equal to each other.

7. The structure according to claim 1, further comprising:
a fourth film formed on the second front surface; and
a fifth film formed on the second rear surface, wherein
a thermal emissivity of the fourth film is higher than thermal emissivities of the second film, the third film and the fifth film.

8. The structure according to claim 7, wherein the thermal emissivity of the first film is equal to the theimal emissivity of the fourth film.

9. The structure according to claim 8, wherein the thermal emissivity of the second film, the thermal emissivity of the third film and the thermal emissivity of the fifth film are equal to each other.

10. The structure according to claim 7, wherein the thermal emissivity of the second film, the thermal emissivity of the third film and the thermal emissivity of the fifth film are equal to each other.

11. The structure according to claim 1, further comprising:
a third portion including a third front surface that faces in a direction different from those of the first front surface and the second front surface, and a third rear surface that faces opposite to the third front surface,
the support portion supporting the first portion, the second portion and the third portion; and
a sixth film formed on the third front surface, wherein
a thermal emissivity of the sixth film is higher than the thermal emissivity of the third film.

12. The structure according to claim 11, wherein the thermal emissivity of the first film is equal to the thermal emissivity of the sixth film.

13. The structure according to claim 12, further comprising
a seventh film formed on the third rear surface, wherein the thermal emissivities of the first film and the sixth film are higher than a thermal emissivity of the seventh film.

14. The structure according to claim 13, wherein the thermal emissivity of the second film, the thermal emissivity of the third film and the thermal emissivity of the seventh film are equal to each other.

15. The structure according to claim 11, further comprising
a seventh film formed on the third rear surface, wherein the thermal emissivities of the first film and the sixth film are higher than a thermal emissivity of the seventh film.

16. The structure according to claim 15, wherein the thermal emissivity of the second film, the thermal emissivity of the third film and the thermal emissivity of the seventh film are equal to each other.

17. The structure according to claim 11, wherein the support portion includes:
a first support member connected to the first rear surface and supporting the first portion;
a second support member connected to the second rear surface and supporting the second portion; and
a frame member arranged between the first rear surface and the second rear surface and connecting the first support member and the second support member, and the third film is formed only on a surface of the frame member.

18. The structure according to claim 17, wherein the frame member includes:
a first frame member including a fourth front surface that faces toward the first front surface side, and a fourth rear surface that faces opposite to the fourth front surface, the fourth front surface being connected to the first support member;
a second frame member including a fifth front surface that faces toward the second front surface side, and a fifth rear surface that faces opposite to the fifth front surface, the fifth front surface being connected to the second support member; and
a third frame member connected to the first frame member and the second frame member,
the first frame member, the second frame member and the third frame member form a truss structure, and
the third film is formed on the fourth front surface, the fourth rear surface, the fifth front surface, the fifth rear surface, and a surface of the third frame member.

19. The structure according to claim 1, wherein the support portion includes:
a first support member connected to the first rear surface and supporting the first portion;
a second support member connected to the second rear surface and supporting the second portion; and
a frame member arranged between the first rear surface and the second rear surface and connecting the first support member and the second support member, and the third film is formed only on a surface of the frame member.

20. The structure according to claim 19, wherein the frame member includes:
a first frame member including a fourth front surface that faces toward the first front surface side, and a fourth rear surface that faces opposite to the fourth front surface, the fourth front surface being connected to the first support member;

a second frame member including a fifth front surface that faces toward the second front surface side, and a fifth rear surface that faces opposite to the fifth front surface, the fifth front surface being connected to the second support member; and a third frame member connected to the first frame member and the second frame member, the first frame member, the second frame member and the third frame member form a truss structure, and the third film is formed on the fourth front surface, the fourth rear surface, the fifth front surface, the fifth rear surface, and a surface of the third frame member.

\* \* \* \* \*